J. C. POTTER.
INDICATOR FOR KNITTING MACHINES.
No. 75,194. Patented Mar. 3, 1868.
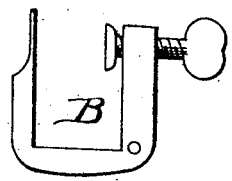
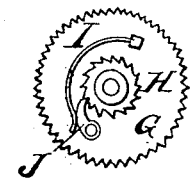
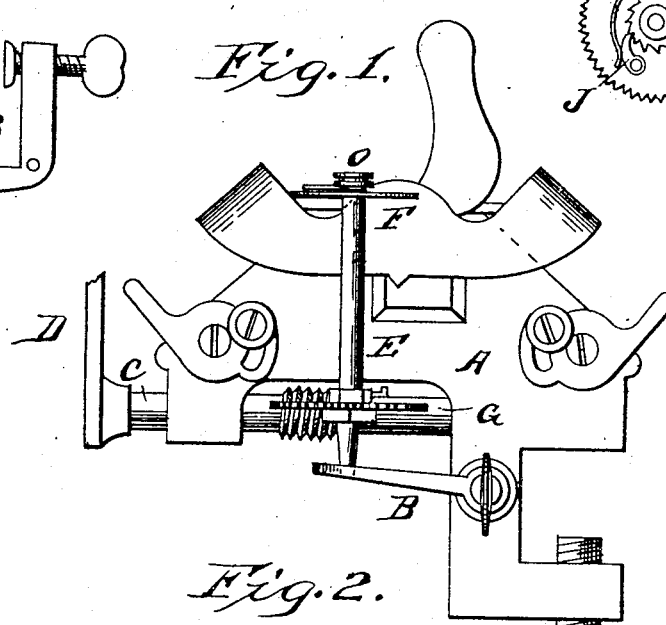
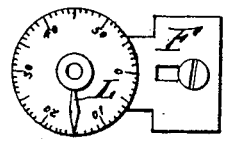

United States Patent Office.

J. C. POTTER, OF ALFRED, NEW YORK.

Letters Patent No. 75,194, dated March 3, 1868.

---

IMPROVEMENT IN INDICATOR FOR KNITTING-MACHINE.

---

The Schedule referred to in these Letters Patent and making part of the same.

---

TO ALL WHOM IT MAY CONCERN:

Be it known that I, J. C. POTTER, of Alfred, in the county of Alleghany, and in the State of New York, have invented certain new and useful Improvements in Indexes for Knitting-Machines; and I do hereby declare that the following is a full, clear, and exact description thereof, reference being had to the accompanying drawings, and to the letters of reference marked thereon.

In the annexed drawings, making part of this specification, A represents one end of a "Lamb," or other similarly-constructed knitting-machine, to which I secure a device for indicating, when the machine is in operation, the number of "rounds" in a stocking or mitten, or any particular portion of either.

This device is constructed and operated as follows: E represents a shaft, which is placed in a vertical position at one end of the machine, with its lower end resting in a bearing in a clamp, B, and its upper end having a bearing in an adjustable dial-plate, F. This shaft is provided upon its upper end, above the dial-plate, with a finger-nut, O, and a pointer or finger, J, and near its lower end with a ratchet-wheel, H, and a gear-wheel, G. The shaft runs through the centre of both the ratchet-wheel and the gear-wheel, the former being made fast to said shaft, while the latter is loose upon it. A pawl, J, which is pivoted to the upper face of the wheel G, has one end pressed into the teeth of the ratchet-wheel H by means of a spring, I. By this arrangement the wheel G is made fast to the shaft, when said shaft revolves in one direction, but is loose upon it when it revolves in the other. The teeth of the wheel G engage in the threads of a screw-thread upon a horizontal shaft, C, by means of which motion is communicated to said wheel. The crank-handle D, which drives the slide-frame of the machine, is secured at one end to the shaft C, and gives motion to it. The shaft C revolves with the crank D. When the shaft C revolves it causes the wheel G to revolve, and with it the ratchet-wheel H and the shaft E. The dial-plate F is provided upon its upper face with suitable notches and figures.

When the shaft C makes one revolution, the wheel G moves one tooth, which moves the shaft E, so that the finger L moves one notch on the dial-plate, and as each revolution of the crank D causes the machine to knit one "round," it will be seen that the finger L always indicates upon the dial-plate the number of "rounds" which have been made in the work upon the machine.

This indicator is very important, as it teaches or tells the operator when the work should be narrowed or widened.

The dial-plate is secured by a set-screw, which passes through a slot in the plate to the upper face of one end of the bed-plate of the machine. The clamp B is secured to the extension of the bed-plate, through which a set-screw passes to secure it to the table upon which the machine is placed. This clamp B is provided of course with a set-screw, for securing it to the machine. By means of the plate F and the clamp B the shaft E is held in a true vertical position, so that the wheel G will always gear truly with the thread on shaft C.

This device for indicating the rounds, being made fast to and forming a part of the knitting-machine, cannot readily get out of order or become deranged in its movement.

It will readily be seen that, after the operator has made a specified number of rounds upon his work, and then wishes to return the finger J again to its starting-point, he has merely to take the nut O between his fingers and turn the shaft E forward until the finger is at the right point. He then commences to work and count anew.

Having thus fully described my invention, what I claim as new, and desire to secure by Letters Patent, is—

1. The arrangement of the shaft E with the gear-wheel G, ratchet-wheel H, finger L, and dial-plate F, substantially as and for the purpose set forth.

2. The combination, with the needle-supporting bed and the shaft C, of a knitting-machine, provided with a screw of the clamp B, shaft E, gear-wheel G, finger L, adjustable dial-plate F, all arranged and operating as set forth.

In testimony that I claim the foregoing, I have hereunto set my hand, this 4th day of January, 1868.

J. C. POTTER.

Witnesses:
C. M. ALEXANDER,
J. M. MASON.